United States Patent
Goodrich et al.

(10) Patent No.: US 10,223,521 B1
(45) Date of Patent: Mar. 5, 2019

(54) SYSTEMS AND METHODS FOR LOCATION DETERMINATION USING RADIO FREQUENCY TAGS

(71) Applicant: JPMorgan Chase Bank, N.A., New York, NY (US)

(72) Inventors: Courtney S. Goodrich, Garnet Valley, PA (US); Daryl W. Wooldridge, Lombard, IL (US); Nicholas M. LoRe, Pearl River, NY (US)

(73) Assignee: JPMorgan Chase Bank, N.A., New York, NY (US)

( * ) Notice: Subject to any disclaimer, the term of this patent is extended or adjusted under 35 U.S.C. 154(b) by 101 days.

(21) Appl. No.: 14/919,087

(22) Filed: Oct. 21, 2015

Related U.S. Application Data (63) Continuation of application No. 14/875,195, filed on Oct. 5, 2015.

(51) Int. Cl.
| | |
|---|---|
| *G08B 5/22* | (2006.01) |
| *G06F 21/44* | (2013.01) |
| *H04W 4/02* | (2018.01) |
| *G06K 7/10* | (2006.01) |
| *G08B 21/18* | (2006.01) |
| *G08B 13/14* | (2006.01) |
| *G07C 9/00* | (2006.01) |

(52) U.S. Cl.
CPC ......... *G06F 21/44* (2013.01); *G06K 7/10366* (2013.01); *G07C 9/00111* (2013.01); *G08B 13/1427* (2013.01); *G08B 21/18* (2013.01); *H04W 4/02* (2013.01)

(58) Field of Classification Search
CPC . G06F 21/44; G07C 9/00111; G08B 13/1427; G08B 21/22; G08B 21/18; G06K 7/10366; H04W 4/02
USPC .......................... 340/10.1, 8.1, 539.23, 573.1
See application file for complete search history.

(56) References Cited

U.S. PATENT DOCUMENTS

| | | | |
|---|---|---|---|
| 6,624,754 B1 * | 9/2003 | Hoffman | G08B 21/023 340/573.1 |
| 8,736,447 B2 * | 5/2014 | Ehrman | G08B 21/0492 340/286.07 |
| 9,384,607 B1 * | 7/2016 | Copeland | G07C 9/00111 |
| 2004/0164867 A1 * | 8/2004 | Jormalainen | G07C 9/00111 340/573.4 |
| 2006/0220798 A1 * | 10/2006 | Willis | G08B 21/0492 340/286.07 |
| 2008/0302867 A1 * | 12/2008 | Holberg | G06Q 30/02 235/375 |

(Continued)

*Primary Examiner* — John A Tweel, Jr.
*Assistant Examiner* — Munear T Akki
(74) *Attorney, Agent, or Firm* — Hunton Andrews Kurth LLP (57) ABSTRACT

Systems and methods for location determination using radio frequency tags are disclosed. In one embodiment, a method may include (1) a back end server receiving, from a RF sensor in a network comprising a plurality of RF sensors, a unique identifier for a sensed tag and an identifier for the RF sensor; (2) the back end server retrieving a location of the RF sensor based on the sensor identification; (3) the back end server associating a sensed tag location with the location; (4) the back end server retrieving authorization information for the sensed tag based on the unique identifier; and (5) the back end server determining that the sensed tag is authorized to be in the location.

14 Claims, 5 Drawing Sheets

(56) References Cited

U.S. PATENT DOCUMENTS

| | | | | |
|---|---|---|---|---|
| 2009/0040040 A1* | 2/2009 | Ben-Itzhak | ........ | G08B 13/1427 340/539.13 |
| 2009/0315679 A1* | 12/2009 | Bauchot | ................ | G08C 21/00 340/10.1 |
| 2011/0125514 A1* | 5/2011 | Molaison | ............... | G01C 21/20 705/2 |
| 2011/0187502 A1* | 8/2011 | Ivanov | .................... | G08B 5/22 340/8.1 |
| 2014/0266704 A1* | 9/2014 | Dalley, Jr. | .............. | G08B 21/18 340/539.13 |

* cited by examiner

SYSTEMS AND METHODS FOR LOCATION DETERMINATION USING RADIO FREQUENCY TAGS

RELATED APPLICATIONS

This application is a continuation of U.S. patent application Ser. No. 14/875,195, filed Oct. 5, 2015, the disclosure of which is incorporated, by reference, in its entirety.

BACKGROUND OF THE INVENTION

1. Field of the Invention

The present invention generally relates to systems and methods for location determination using radio frequency tags.

2. Description of the Related Art

Radio frequency identification uses wireless electromagnetic fields to transmit data to identify and track objects. A benefit of the use of radio frequency technology over bar code technology is that the it is not necessary for a direct line of sight for the radio frequency tag to be read.

SUMMARY OF THE INVENTION

Systems and methods for authentication using radio frequency tags are disclosed. In one embodiment, an authorization system that controls access to a resource that is controlled by a primary user by a secondary user, may include a mobile device comprising at least one computer processor and executing a secondary user mobile application by a secondary user; a back end comprising at least one computer processor in communication with the secondary user mobile application and a resource; and a tag associated with the secondary user and comprising a unique identifier that is readable by the secondary user's mobile device and is provided to the secondary user mobile application. The secondary user mobile application may receive a requested operation involving the resource and communicates the requested operation to the back end; the secondary user mobile application may receive the unique identifier from the tag and communicates the unique identifier to the back end; the back end may approve the requested operation based on a comparison between the unique identifier that was received from the secondary user and an expected unique identifier; and the secondary user mobile application may perform the requested operation.

In one embodiment, prior to the back end approving the requested operation, the back end may determine that the requested operation is not a routine operation; the back end may communicate the requested operation to a mobile application associated with the primary user; and the back end may receive approval for the requested operation from the mobile application associated with the primary user.

In another embodiment, prior to the back end approving the requested operation, the back end may determine that the requested operation is a routine operation.

In one embodiment, the tag may be a RF tag, may be physically separate from the secondary user's mobile device, or may be stored on the secondary user's mobile device.

Methods for approving a requested operation from a secondary user of a resource that is controlled by a primary user are disclosed. In one embodiment, a method may include (1) a back end comprising at least one computer processor receiving, from a mobile application that is executed by a mobile device associated with a secondary user, a requested operation involving a resource that is controlled by a primary user; (2) the back end receiving a unique identifier from the secondary user mobile application, the unique identifier being read by the mobile application from a tag associated with the secondary user; (3) the back end determining that the received unique identifier matches a stored unique identifier that is associated with the secondary user; and (4) the back end approving the requested operation and communicating the approval to the secondary user mobile application.

In one embodiment, the method may further include, prior to the back end approving the requested operation, the back end determines that the requested operation is not a routine operation; the back end communicates the requested operation to a mobile application associated with the primary user; and the back end receives approval for the requested operation from the mobile application associated with the primary user.

In another embodiment, the method may further include, prior to the back end approving the requested operation, the back end determines that the requested operation is a routine operation.

In one embodiment, the tag may be a RF tag, may be physically separate from the secondary user's mobile device, or may be stored on the secondary user's mobile device.

In one embodiment, the requested operation may be a purchase, and the resource may be a transaction account. In another embodiment, the requested operation may be an access, and the resource may be an area.

In another embodiment, a method for approving a requested operation from a secondary user of a resource that is controlled by a primary user may include (1) a mobile application that is executed by a mobile device associated with a secondary user receiving a requested operation involving a resource that is controlled by a primary user from a secondary user; (2) the mobile application reading a unique identifier from a tag associated with the secondary user; (3) the mobile application determining that the received unique identifier matches a stored unique identifier that is associated with the secondary user; (4) the mobile application determining that the requested operation is a routine operation; (5) the mobile application approving the requested operation; and (6) the mobile application performing the requested operation.

In one embodiment, the requested operation may be a purchase, and the resource may be a transaction account. In another embodiment, the requested operation may be an access, and the resource may be an area.

In one embodiment, the unique identifier may be read by RF communication.

In one embodiment, if the mobile application determines that the requested operation is not a routine operation, the method may further include the mobile application communicating the requested operation and the unique identifier to a back end; and the mobile application receiving approval for the requested operation from the back end.

In one embodiment, the secondary user approves the requested operation.

In other embodiments, systems and methods for location determination using radio frequency tags are disclosed. In one embodiment, a method may include (1) a back end server receiving, from a RF sensor in a network comprising a plurality of RF sensors, a unique identifier for a sensed tag and an identifier for the RF sensor; (2) the back end server retrieving a location of the RF sensor based on the sensor identification; (3) the back end server associating a sensed tag location with the location; (4) the back end server retrieving authorization information for the sensed tag based on the unique identifier; and (5) the back end server determining that the sensed tag is authorized to be in the location.

In one embodiment, the authorization information may include at least one authorized location for the sensed tag, at least one unauthorized location for the sensed tag, an authorized period of time for the sensed tag, an expiration time for the sensed tag, or any combination thereof.

In one embodiment, the method may further include the back end server storing the location for the sensed tag in a location history for the sensed tag.

In one embodiment, the sensed tag may be a passive RF tag.

In one embodiment, the method may further include the back end server receiving updated authorization information for the sensed tag.

In one embodiment, the method may further include the back end server generating an alert in response to the sensed tag being unauthorized to be at the location.

In another embodiment, systems for determining a location of a radio frequency tag are disclosed. In one embodiment, a system may include a tag comprising a unique identifier that is read by radio frequencies; a network comprising a plurality of RF sensors, each RF sensor having a sensor identification; and a back end server in communication with the network of RF sensors. The back end server may include a computer processor and may perform the following: (1) receive from one of the RF sensors in the network a unique identifier for a sensed tag and an identifier for the RF sensor; (2) retrieve a location of the RF sensor based on the sensor identification; (3) associate a sensed tag location with the location; (4) retrieve authorization information for the sensed tag based on the unique identifier; and (5) determine that the sensed tag is authorized to be in the location.

In one embodiment, the authorization information may include at least one authorized location for the sensed tag, at least one unauthorized location for the sensed tag, an authorized period of time for the sensed tag, an expiration time for the sensed tag, or any combination thereof.

In one embodiment, the back end server may store the location for the sensed tag in a location history for the sensed tag.

In one embodiment, the sensed tag may be a passive RF tag.

In one embodiment, the back end server may receive updated authorization information for the sensed tag.

In one embodiment, the back end server may generate an alert in response to the sensed tag being unauthorized to be at the location.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Several embodiments of the present invention and their advantages may be understood by referring to FIGS. 1-5.

Embodiments disclosed herein relate to the use of identification technology, such as radio frequency (RF) tags to authenticate a primary or secondary user to another user, a mobile application, a back end, etc. RF tags may be active and use an internal battery as a power source, or they may be passive and not use a power source. Passive RF tags may be cheaper and thinner than their active counterparts.

Other tags, including Bluetooth Low Energy (BLE) tags, NFC tags, WiFi tags, GPS chips, etc. may be used instead of, or in conjunction with, RF tags as is necessary and/or desired.

In one embodiment, a RF tag may be used in conjunction with an application that is executed by a mobile device to authenticate a secondary user and thereby provide the secondary user with access to a resource. As used herein, a secondary user may be a user or organization that requests approval of an operation from a primary user, such as access to a resource that is controlled by a primary user. The access may be considered to be an entitlement, permission, or privilege that is granted to the secondary user. Example resources include transaction accounts (e.g., credit card accounts, savings, accounts, etc.), secure areas (e.g., areas of buildings), network access (e.g., access to applications, shared drives, etc.) programming/entertainment (e.g., television, video games, etc.). For example, a secondary user may be an employee, a child, a spouse, a dependent, a friend, etc. The primary user may be a representative of an organization, a senior employee, a parent, a spouse, a homeowner, a landlord, etc.

The entitlements, permissions, and/or privileges for the secondary user may involve an authorized number of transactions, a spending/withdrawal limit, a restriction on a type of transactions, a restriction on a transaction time and/or geographical location, an expiration, etc. Any suitable entitlement, permission, and/or privilege may be established and controlled by the primary user as is necessary and/or desired.

In one embodiment, the primary user may grant entitlements, permissions, and/or privileges, set limitations on the entitlements, permissions, and/or privileges, etc. using, for example, the primary user's mobile device. In one embodiment, the entitlements, permissions, and/or privileges, or the limitations thereon, may be set in real-time.

In another embodiment, the RF capability of the tag may enable tracking of the tag independent of the mobile device through a network of RF sensors. GPS tracking may also be used if the tag has GPS capability. In another embodiment, a location of device associated with the tag may also be tracked.

In one embodiment, the system may "learn" which transactions are routine, and which ones are not. Routine transactions may be approved with a low level of authentication, while non-routine transactions (e.g., high dollar, transactions of first impression, transactions at an unexpected time/location, etc.) may require a higher level of authentication.

In one embodiment, the primary user may approve a request from the secondary user by, for example, presenting his or her own RF tag to his or her mobile device. This may function to authenticate the primary user and authorize the secondary user's request. In another embodiment, the primary user may present a biometric (e.g., fingerprint) to his or her mobile device to authorize the request. Other means of authorizing the request, including entry of a code, password, etc. may be used as necessary and/or desired.

In one embodiment, the primary user may receive a request for approval by email, SMS, voice messaging, etc. Any suitable way of presenting and receiving approval of a request may be used as is necessary and/or desired.

In one embodiment, approvals may be limited to a single use. In another embodiment, approvals may cover multiple users. In still another embodiment, an approval may indicate that the transaction is routine and similar transactions will be approved in the future. In one embodiment, approvals may be granted for a specific time period.

While the present disclosure may be in the context of RF tags, it should be recognized that the disclosure is not limited to RF tags. Other types of tags, including optical tags (e.g., machine readable codes such as bar codes, QR codes, etc.), IR codes, biometrics, etc. may be used as is necessary and/or desired. In general, any sort of tag, device, and/or input that may store and/or transmit a unique identifier may be used as is necessary and/or desired.

Figure 1:
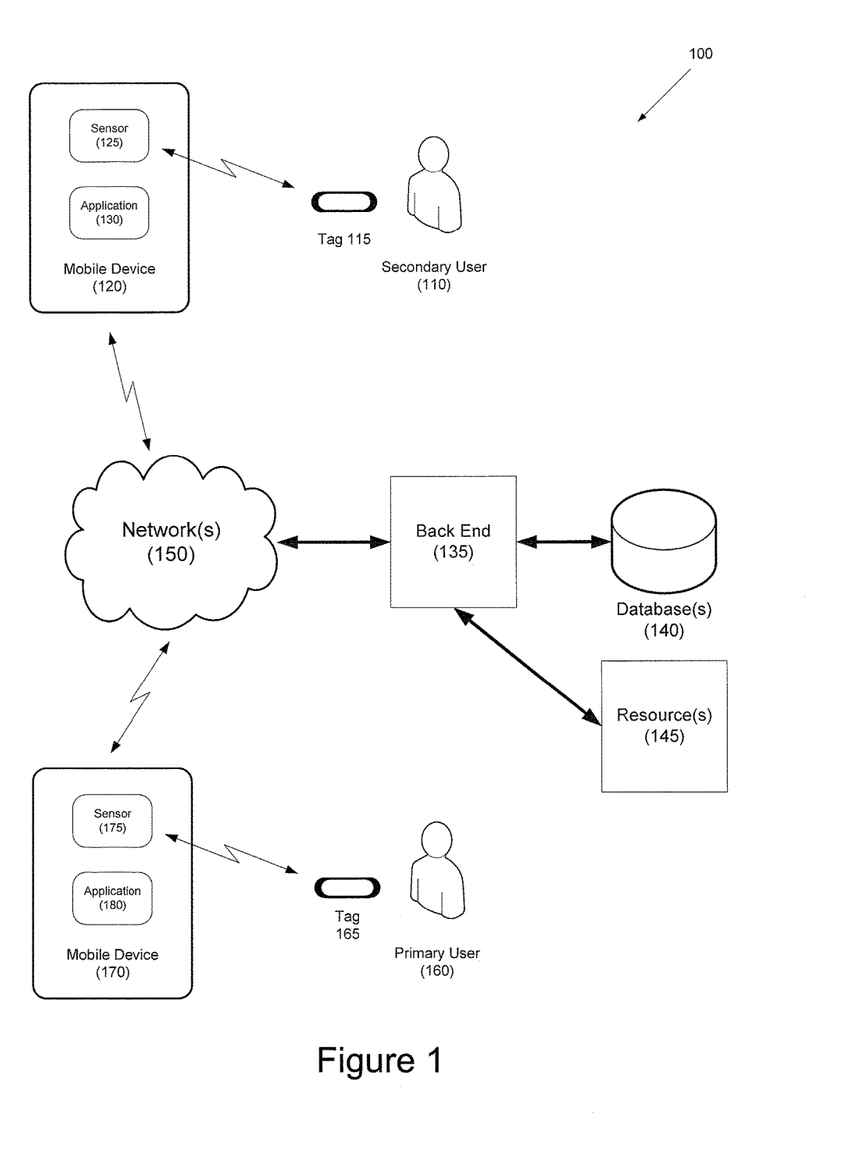
FIG. 1 depicts a system for authentication using radio frequency tags according to one embodiment.

Referring to FIG. 1, a system for authentication using radio frequency tags according to one embodiment is disclosed. System 100 may include mobile device 120 that may include sensor 125. In one embodiment, sensor 125 may receive electromagnetic communications (e.g., RF antenna, WiFi radio, Bluetooth radio, NFC antenna, etc.). In another embodiment, sensor 125 may be a camera. In still another embodiment, sensor 125 may be an input device (e.g., biometric sensor, keypad, etc.) Any type of sensor that is appropriate for interacting with tag 115 may be used as is necessary and/or desired.

Mobile device 120 may also execute mobile application 130 that may permit secondary user 110 to request an operation, such as access to resource 145, for secondary user 110. For example, mobile application 130 may be a mobile banking application, a mobile wallet application, a mobile payment application, an authentication application, an application that grants access to areas, etc.

Secondary user 110 may have in his or her possession, custody, and/or control tag 115. Tag 115 may be, for example, a RF tag. Other types of tags may be used as is necessary and/or desired.

As discussed above, a RF tag may be active (i.e., powered) or passive (i.e., unpowered). In one embodiment, tag 115 may be separate from mobile device 120 and kept in, or attached to, user 110's wallet, purse, keychain, etc. In another embodiment, tag 115 may be co-located with mobile device 120 (e.g., stored in or attached to mobile device 120's case). It should be recognized that colocation of tag 115 and mobile device 120 may not provide as much security as if tag 115 and mobile device 120 were physically separate, such as if tag 115 were stored on a keychain or otherwise separate from mobile device 120.

In one embodiment, the proximity of tag 115 to mobile 120 may be used to activate, enable, etc. mobile device 120. For example, when mobile device 115 is moved outside of a certain distance from mobile device 120, mobile device 120 may become inoperable, its display may be obscured, etc. Tag 165 and mobile device 160 may have similar functionality.

The disclosure of U.S. patent application Ser. No. 13/032, 952 is incorporated, by reference, in its entirety.

In one embodiment, primary user 160 may similarly access his or her mobile device 170. In one embodiment, primary user 160 may control access to resource 145, and may grant secondary user 110 one or more entitlement, permission, and/or privilege to that resource 145. For example, primary user 160 may grant secondary user 110 permission to conduct transactions using an account, to make purchases using an account, to access areas, to perform functionality associated with mobile device 120, etc.

In one embodiment, primary user 160 may disable tag 115 as is necessary and/or desired.

Mobile device 170 may include sensor 175 and may execute mobile application 180. In one embodiment, mobile application 180 may be the same mobile application as mobile application 130, or it may be a different application. In one embodiment, mobile application 180 may be complementary to mobile application 130, such that primary user 160 may identify entitlements, permissions, and/or privileges etc. that may be presented to secondary user 110.

Primary user 160 may further have in his or her possession, custody and/or control tag 165. Tag 165 may be the same type of tag as tag 115, or it may be a different type of tag. For example, tag 115 may be a passive RF tag, while tag 165 may be an active RF tag.

Mobile devices 120 and 170 may communicate with back end 135 via network(s) 150. Network(s) 150 may be any suitable communication network or combination of communication networks, including wired, WiFi, cellular, Bluetooth, etc. In one embodiment, back end 135 may be provided or hosted by a financial institution, a security organization, or any organization that may host or control access to a resource, such as resource(s) 145. Back end 135 may interact with database(s) 140, resource(s) 145, third parties (not shown), etc. In one embodiment, back end 135 may comprise one or more servers (not shown).

For example, if back end 135 is part of, or associated with, a financial institution, back end 135 may approve a request from secondary user 110 for access to a transaction account controlled by primary user 160.

In one embodiment, back end 135 may approve a request from secondary user 110 based on data related to the request, the tag data received from the secondary user 110, and the authorizations from primary user 160. In one embodiment, authorizations from primary user 160 may be stored (e.g., pre-approved subject to authentication of secondary user 110); in another embodiment, authorizations may be sought from primary user 160 in real time, substantially in real time, or off-line. In one embodiment, based on prior requests and approval of those requests, mobile application and/or back end 135 may identify routine requests (e.g., frequent requests that are approved) and may approve those routine requests without primary user intervention and/or approval.

In one embodiment, non-routine requests, requests that present an amount of risk above a certain threshold (e.g., high dollar amount, certain geographical areas, certain merchants, etc.) may require additional authentication from either the secondary or primary user.

Figure 2:
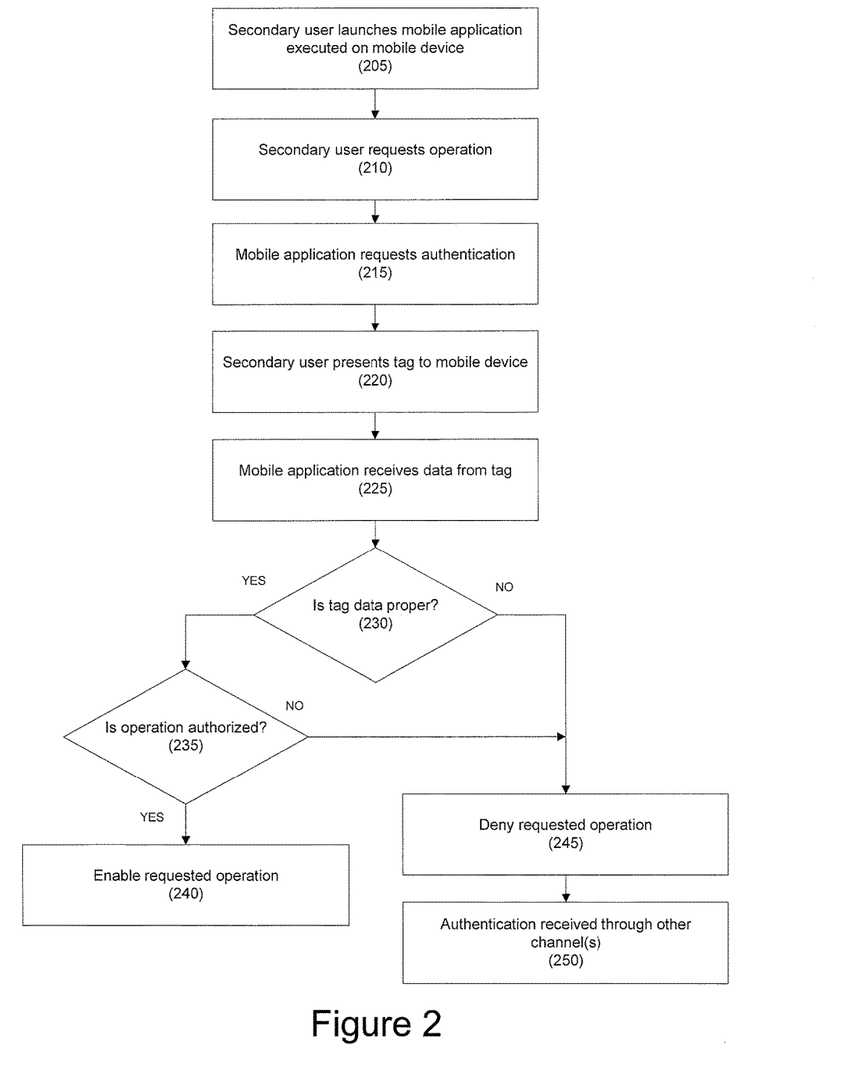
FIG. 2 depicts a method for authentication using radio frequency tags according to one embodiment.

Referring to FIG. 2, a method for authentication using radio frequency tags according to one embodiment is disclosed. In step 205, a secondary user may execute a mobile application on a mobile device, and, in step 210, the secondary user may request an operation, such as access to resource. In one embodiment, the operation may be a transaction, access to an area, access to data, etc. Other operations may be requested as is necessary and/or desired.

In step 215, the mobile application may request authentication, identification, etc. from the secondary user. This may be in the form of the unique identifier from the secondary user's tag. In one embodiment, the mobile application may instruct the secondary user to present his or her tag to the mobile device for reading, scanning, imaging, etc.

In one embodiment, the tag may be registered to the secondary user. For example, upon receiving the tag, the secondary user may present the tag to the mobile application, which may store the unique identifier for future use.

In one embodiment, the tag may be further associated with the secondary user's mobile device, mobile application, etc.

In step 220, the user may present the tag to the mobile device, and in step 225, the mobile application may read data from the tag. In one embodiment, the data may be received via RF communication. In another embodiment, the data may be received optically. Data may be received in other manners as is necessary and/or desired.

In step 230, the mobile application and/or back end may determine if the tag data is proper. In one embodiment, the mobile application and/or back end may verify that the unique identifier that is read from the presented tag matches the unique identifier that is associated with the secondary user.

In one embodiment, the mobile application may not need to interact with the back end in order to verify the data read from the tag. Rather, the mobile application may store the data associated with the tag and may compare the stored tag data with the received tag data.

In step 235, the mobile application and/or back end may verify that the primary user has authorized the requested operation to be performed by the secondary user. In step 240, if the requested operation has been authorized, or is a routine transaction, the mobile application and/or back end may enable the requested operation. For example, if the requested operation is to make a purchase, the mobile application may present payment information to a merchant.

In step 245, if the tag data is improper, or the requested operation is not authorized, the operation may be denied. In one embodiment, in step 250, the secondary user may be given an option to present authentication information through a different channel to request authorization from the primary user. An embodiment in which authorization may be sought from the primary user is disclosed in FIG. 3.

In one embodiment, the primary user may be notified of failed authentication. This may be provided by SMS, email, voice message, banner notification, or any other notification method as is necessary and/or desired.

Figure 3:
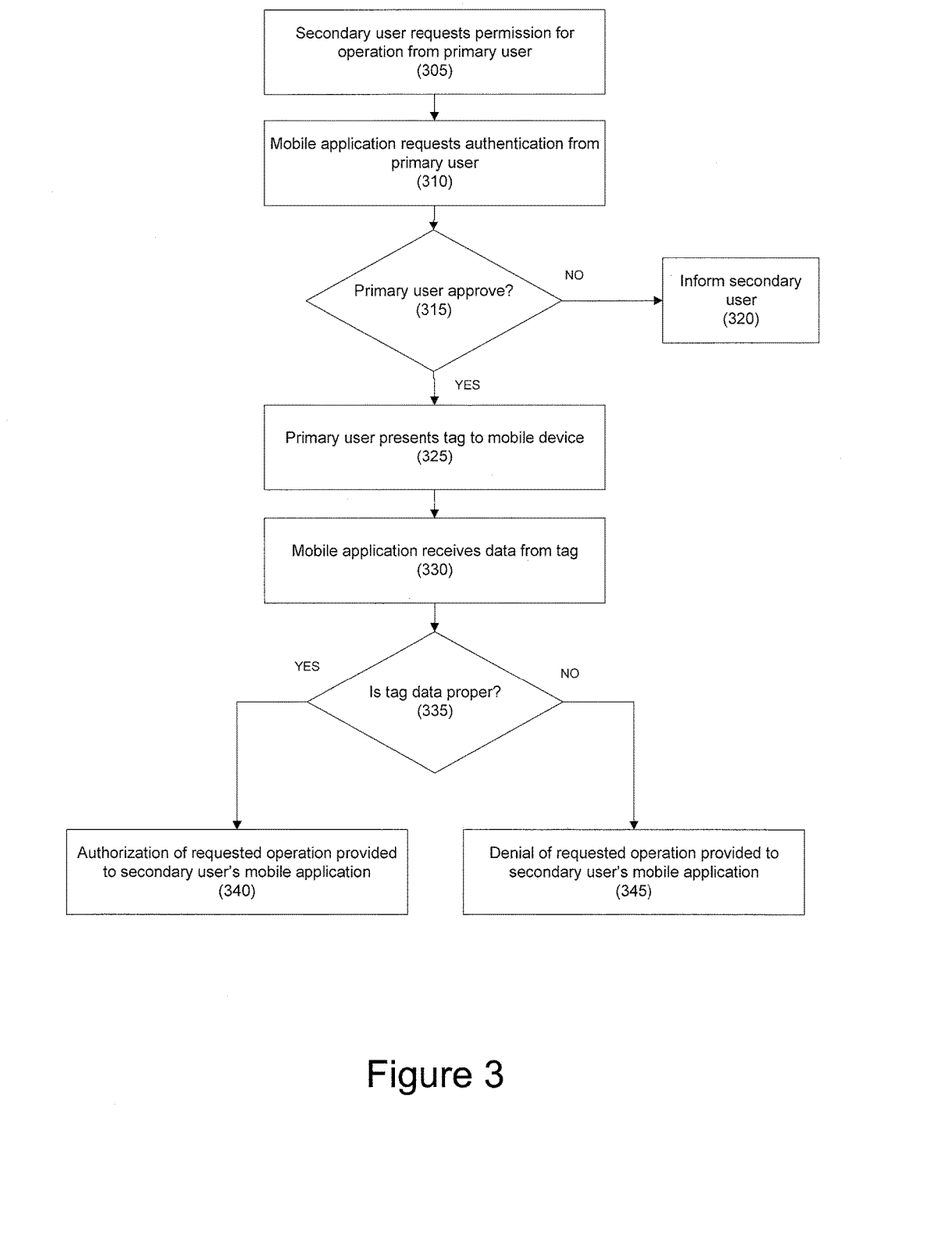
FIG. 3 depicts a method for authorizing an operation requested by a secondary user

Referring to FIG. 3, a method for authorizing an operation requested by a secondary user is disclosed according to one embodiment.

In step 305, a secondary user may request permission to conduct an operation from a primary user. In one embodiment, the request may be a result of the requested operation being denied, as discussed above. In another embodiment, the request may be separate from any specific operation.

In on embodiment, the request may be made using the secondary user's mobile application.

In step 310, the secondary user's mobile application may request authorization from the primary user. In one embodiment, the secondary user's mobile application may transmit the request with details for a requested operation. For example, if the secondary user is requesting authorization to purchase an item using an account controlled by the primary user, details on the pending transaction (e.g., amount, merchant information, product information, etc.), whether the secondary user has presented his or her tag, etc. may be provided to the primary user.

In step 315, the primary user may approve or deny the requested operation. If the primary user denies the requested operation, the secondary user may be informed of such denial in step 320. In one embodiment, the primary user may approve by responding to a SMS, email, voice message, push message, etc.

If the primary user approves the requested operation, in step 325, primary user may be requested to present his or her tag to the mobile device. In step 330, the primary user's mobile application may receive tag data from the primary user's tag.

In step 335, if the tag data is proper, i.e., the tag data authenticates the primary user, in step 340, the secondary user's mobile application may be informed that the requested operation is approved. If the tag data is improper, i.e., the tag data does not authenticate the primary user, in step 345, the secondary user's mobile application may be informed that the requested operation is denied.

In one embodiment, the primary user may be authenticated using other methods as is necessary and/or desired. For example, the primary user may present a biometric, enter a code, perform out-of-band authentication, etc.

In one embodiment, the mobile application and/or back end may store the results of the authentication, including time/date, the requested operation, and the result. Over time, the mobile application and/or the back end may determine which requests are routine—such as frequent requests that are always approved by the primary user—and which are not. If authorized by the primary user, the mobile application and/or mobile device may permit routine requests to be authorized without interaction from the primary user. The secondary user may still be required to provide his or her tag.

Figure 4:
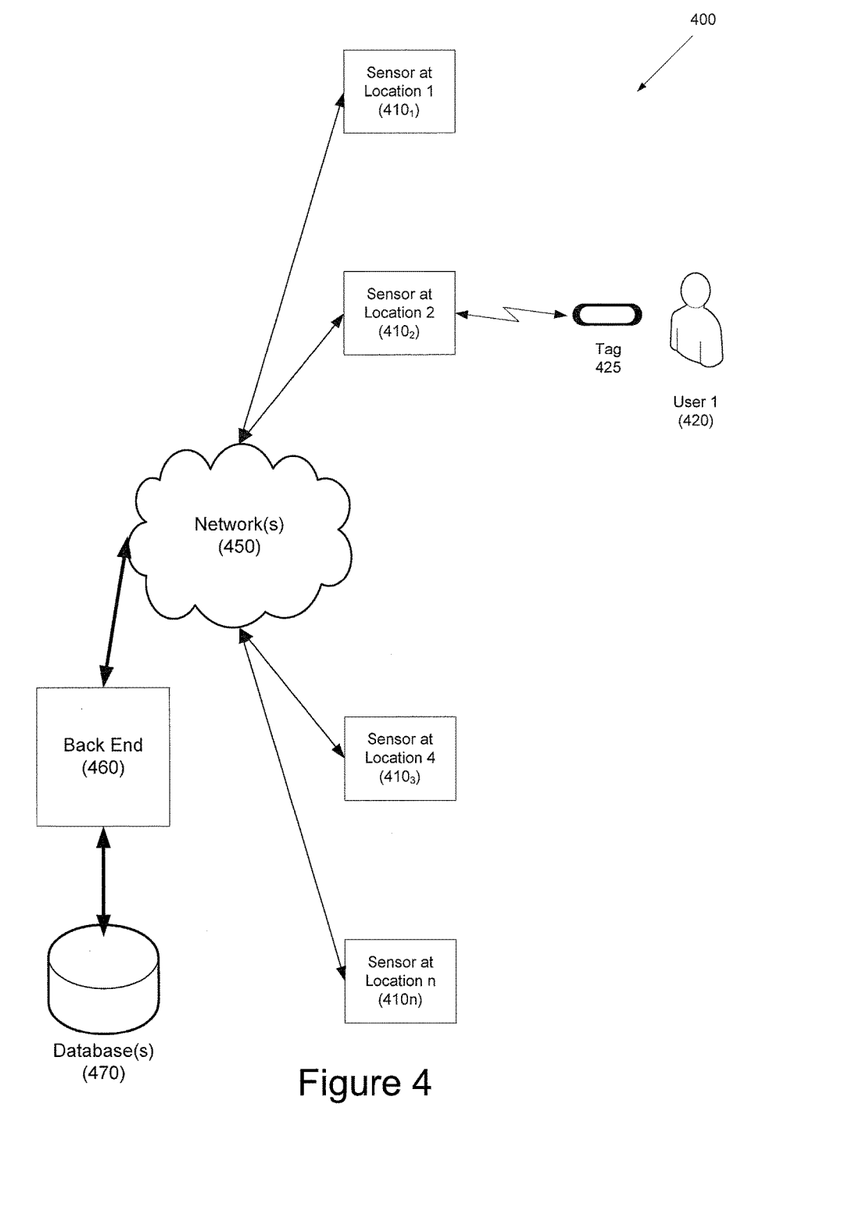
FIG. 4 depicts a system for location tracking using radio frequency tags according to one embodiment.

Referring to FIG. 4, a system for location tracking using radio frequency tags according to one embodiment is disclosed. System 400 may include a plurality of sensors ($410_1$, $410_2$, $410_3$, ... $410_n$) that may interact with tag 425. In one embodiment, if tag 425 is a RF tag, sensors $410_1$, $410_2$, $410_3$, ... $410_n$ may be RF sensors. Any suitable tag/sensor arrangement may be used as is necessary and/or desired.

In one embodiment, each or sensors $410_1$, $410_2$, $410_3$, ... $410_n$ may be positioned based on its range, the desired accuracy of the location, the geometry of the area, etc. In general, sensors $410_1$, $410_2$, $410_3$, ... $410_n$ may be positioned and dispersed as is necessary and/or desired.

Sensors $410_1$, $410_2$, $410_3$, ... $410_n$ may communicate with back end 460 via network(s) 450. Network(s) 450 may be any suitable communication network or combination of communication network including, for example, wired, WiFi, RF, Bluetooth, cellular, etc.

Each of sensors $410_1$, $410_2$, $410_3$, ... $410_n$ may have a registered location with back end 460 that may be stored, for example, in database(s) 470.

In one embodiment, as user 420 moves tag 425 through an area, one or more of sensors $410_1$, $410_2$, $410_3$, ... $410_n$ may detect or identify the presence of tag 425. For example, as illustrated in FIG. 4, sensor $410_2$ is illustrated as identifying or detecting tag 425. Sensor $410_2$ would then communicate this detection to back end 460 via network(s) 450, which may then update a location for tag 425.

In one embodiment, due to range limitations, if passive RF tags are used, the number of sensors $410_1$, $410_2$, $410_3$, ... $410_n$ may be greater than if active RF tags are used. In one embodiment, tag 425 may be detected when user 420 moves within range of one of sensors $410_1$, $410_2$, $410_3$, ... $410_n$. In another embodiment, user 420 may be required to present tag 425 to one of sensors $410_1$, $410_2$, $410_3$, ... $410_n$ for identification.

Figure 5:
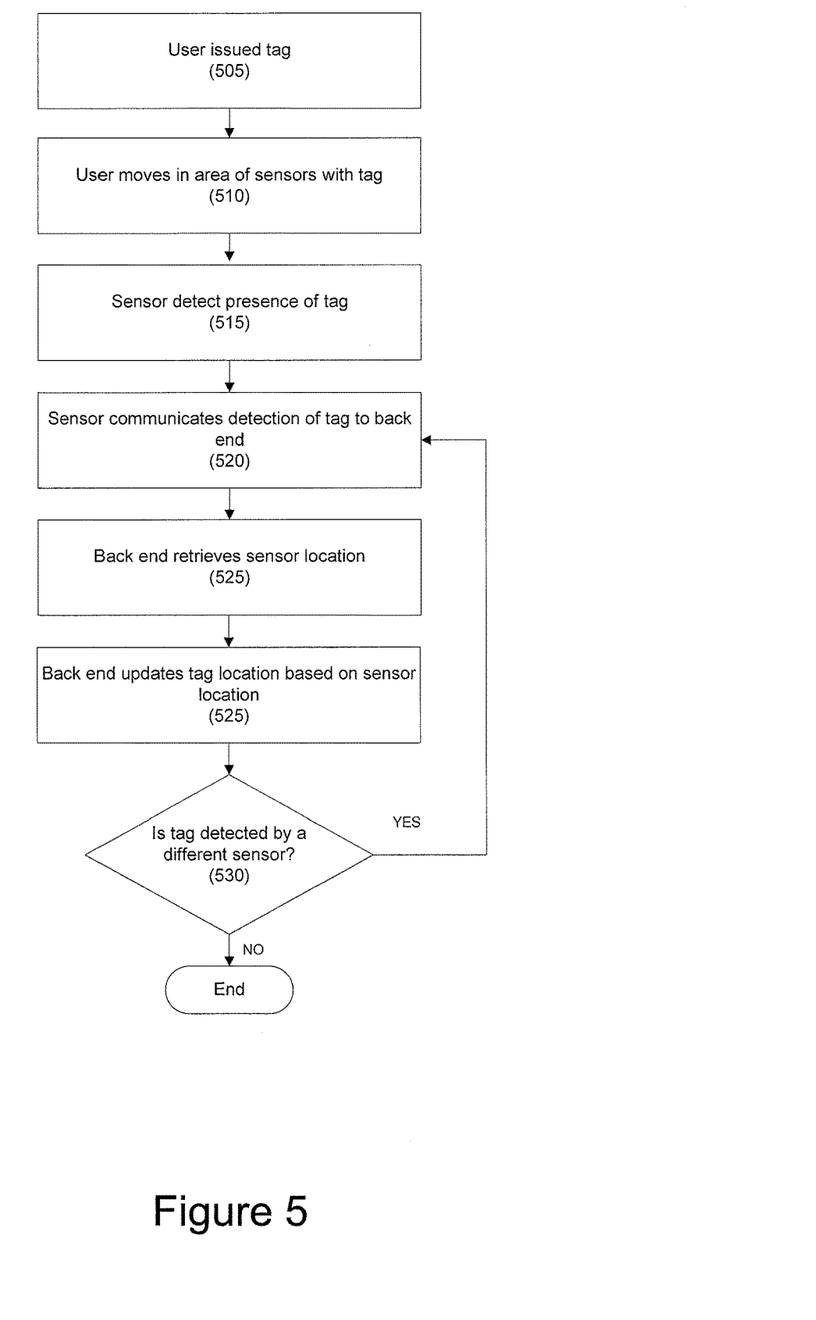
FIG. 5 depicts a method for location tracking using radio frequency tags according to one embodiment.

Referring to FIG. 5, a method for location tracking using radio frequency tags according to one embodiment is disclosed.

In step 505, a user may be issued a tag. In one embodiment, the tag may be a passive RF tag, as discussed above. Other types of tags, including active RF, BLE, machine-readable codes, etc. may be used as is necessary and/or desired.

In one embodiment, the tag may have a unique identifier. As part of the registration process, the unique identifier may be recorded, and any access restrictions (e.g., off limit areas, approved areas, etc.), time/date limits (e.g., limited to a morning meeting), or other restrictions (not permitted to have unaccompanied access to certain areas, etc.), etc. may be entered and associated with the unique identifier.

In one embodiment, any restrictions may be updated at any time.

In one embodiment, information regarding the user, the user's sponsor (e.g., the person who authorized the tag), etc. may be associated with the unique identifier.

In one embodiment, the issuing of the tag and data entry may be performed, for example, at a building security console, by a receptionist, etc. In one embodiment, the tag may be part of a temporary access badge, pass, etc. It may be reusable, or it may be disposable.

In one embodiment, the tag may be part of, or affixed to, a temporary access pass, badge, etc.

In step 510, the user may move in an area of sensors with the tag.

In step 515, a sensor may detect the presence of the tag. In one embodiment, the sensor may detect the tag as it comes within the sensors range without being specifically presented to the sensor. In another embodiment, the user may present the tag to the sensor so the tag can be read.

In one embodiment, the sensor may read a unique identifier that is assigned to the tag.

In step 520, the sensor may communicate the detection of the tag to the back end. In one embodiment, the sensor may communicate the tag's unique identifier and a sensor identifier to the back end.

In step 525, the back end may retrieve the sensor's location. In one embodiment, this may be based on the sensor identifier that is received. In one embodiment, the back end may retrieve the location from a database that associates sensor identifiers with locations. In one embodiment, the sensor locations may include GPS locations.

In step 525, the back end may update the tag location based on the sensor location. In one embodiment, the location of the tag may be presented on, for example, a map.

In one embodiment, if the tag is sensed by a sensor in an area in which the tag is not authorized, an alert may be sent to a responsible party (e.g., a security desk, the person who is responsible for issuing the tag, etc.). In one embodiment, other security actions (e.g., sounding an alarm near the sensor that detected the tag, locking doors, etc.) may be taken as is necessary and/or desired.

In one embodiment, if the sensor is used to access an area behind a secure door, and the tag is authorized for such access, the back end may unlock the door.

In step 530, if another sensor detects the tag, the process may be repeated with the new sensor communicating the detection of the tag back to the back end.

The following disclosures are incorporated, by reference, in their entireties: U.S. Provisional Patent Application Ser. No. 61/861,676, filed Aug. 2, 2013; U.S. Provisional Patent Application Ser. No. 61/886,474, filed Oct. 3, 2013; U.S. patent application Ser. No. 14/077,869, filed Nov. 12, 2013.

It should be recognized that although several embodiments have been disclosed, these embodiments are not exclusive and aspects of one embodiment may be applicable to other embodiments.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ 8 operating system, Microsoft Windows™ 7 operating system, the Microsoft Windows™ Vista™ operating system, the Microsoft Windows™ XP™ operating system, the Microsoft Windows™ NT™ operating system, the Windows™ 2000 operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for determining a location of a radio frequency (RF) tag in a network comprising a plurality of RF sensors, comprising:
   a back end server receiving, from a RF sensor in a network comprising a plurality of RF sensors, a unique identifier for a sensed RF tag and an identifier for the RF sensor;
   the back end server retrieving a first location of the RF sensor based on the RF sensor identifier;
   the back end server updating a stored location for the sensed RF tag based on the first location of the RF sensor;
   the back end server retrieving authorization information for the sensed RF tag based on the unique identifier, the authorization information indicating one or more authorized locations for the RF tag and an expiration time for the sensed RF tag from a database;
   the back end server determining a direction of travel for the sensed RF tag based on the sensed RF tag being sensed by a plurality of RF sensors and a location of each of the RF sensors;
   the back end server identifying a secure area in the direction of travel;
   the back end server determining that the sensed RF tag is authorized to be in the secure area;
   the back end server unlocking an access point for the secure area as the sensed RF tag approaches the access point;
   the back end server determining that the sensed RF tag has expired based on the expiration time;
   the back end server expiring the sensed RF tag so that the sensed RF tag cannot be used again by removing the sensed RF tag from a list of active RF tags in the database;
   the back end server generating and communicating an alert in response to the sensed RF tag expiring.

2. The method of claim 1, wherein the authorization information comprises at least one authorized location for the sensed RF tag.

3. The method of claim 1, wherein the authorization information comprises at least one unauthorized location for the sensed RF tag.

4. The method of claim 1, wherein the authorization information comprises an authorized period of time for the sensed RF tag.

5. The method of claim 1, further comprising:
   the back end server storing the location for the sensed RF tag in a location history for the sensed RF tag.

6. The method of claim 1, wherein the sensed RF tag is a passive RF tag.

7. The method of claim 1, further comprising:
   the back end server receiving updated authorization information for the sensed RF tag.

8. A system for determining a location of a radio frequency (RF) tag, comprising:
   a RF tag comprising a unique identifier that is read by radio frequencies;
   a network comprising a plurality of RF sensors, each RF sensor having a sensor identification; and
   a back end server in communication with the network of RF sensors, wherein the back end server comprises a computer processor and performs the following:
      receive from one of the RF sensors in the network a unique identifier for a sensed RF tag and an identifier for the RF sensor;
      retrieve a location of the RF sensor based on the RF sensor identifier;
      update a stored location for the sensed RF tag based on the location of the RF sensor;
      retrieve authorization information for the sensed RF tag based on the unique identifier, the authorization information indicating one or more authorized locations for the RF tag and an expiration time for the sensed RF tag from a database;
      determine a direction of travel for the sensed RF tag based on the sensed RF tag being sensed by a plurality of RF sensors and a location of each of the RF sensors;
      identify a secure area in the direction of travel;
      determine that the sensed RF tag is authorized to be in the secure area;
      unlock an access point for the secure area as the sensed RF tag approaches the access point;
      determine that the sensed tag has expired based on the expiration time;
      expire the sensed RF tag so that the sensed RF tag cannot be used again by removing the sensed RF tag from a list of active RF tags in the database; and
      generate and communicate an alert in response to the sensed RF tag expiring.

9. The system of claim 8, wherein the authorization information comprises at least one authorized location for the sensed RF tag.

10. The system of claim 8, wherein the authorization information comprises at least one unauthorized location for the sensed RF tag.

11. The system of claim 8, wherein the authorization information comprises an authorized period of time for the sensed RF tag.

12. The system of claim 8, wherein the back end server further stores the location for the sensed RF tag in a location history for the sensed tag.

13. The system of claim 8, wherein the sensed RF tag is a passive RF tag.

14. The system of claim 8, wherein the back end server further receives updated authorization information for the sensed RF tag.

\* \* \* \* \*